US005239782A

United States Patent [19]

Lorenz et al.

[11] Patent Number: 5,239,782

[45] Date of Patent: Aug. 31, 1993

[54] METHOD FOR RECORDING REMOVAL OF MATERIAL DURING PRECISION FINISHING OF PRE-PROFILED WORK PIECES

[75] Inventors: Manfred Lorenz, Coburg; Hermann Beckering, Ahorn, both of Fed. Rep. of Germany

[73] Assignee: Kapp & Co. Werkzeugmaschinenfabrik, Coburg, Fed. Rep. of Germany

[21] Appl. No.: 662,476

[22] Filed: Feb. 28, 1991

[30] Foreign Application Priority Data

Jan. 15, 1991 [EP] European Pat. Off. ........ 91100390.3

[51] Int. Cl.[5] .............................................. B24B 49/00

[52] U.S. Cl. ............................... 51/165 R; 51/165.71; 51/165.74; 51/326; 51/287

[58] Field of Search ........... 51/165 R, 165.71, 165.74, 51/165.75, 165.76, 281 R, 323

[56] References Cited

FOREIGN PATENT DOCUMENTS 0065247 11/1982 European Pat. Off. .
0199961 12/1986 European Pat. Off. .

*Primary Examiner*—M. Rachuba

*Attorney, Agent, or Firm*—Robert W. Becker & Associates

[57] ABSTRACT

A method for recording the removal of material during high precision finishing work pieces that must be of an extremely precise shape and must withstand extreme stress, as required especially in the aviation industry, is provided which ensures that the work piece has a hardened layer of a required minimum thickness at all stressed or load-carrying positions.

2 Claims, 2 Drawing Sheets

3

2

4

1

METHOD FOR RECORDING REMOVAL OF MATERIAL DURING PRECISION FINISHING OF PRE-PROFILED WORK PIECES

BACKGROUND OF THE INVENTION

The present invention relates to a method for recording the removal of material during the precision finishing of pre-profiled work pieces, especially toothings, on a machine tool comprising a tool, a sensor and a computing device, the tool preferably being a grinding or polishing tool.

Especially in the aviation industry, profiled components such as toothings are employed. It is important that these components not only are a precisely shaped but are also provided with a layer of hard materials of a uniform thickness, especially in load-carrying or stressed areas. Therefore, during the manufacture of such components on machine tools, attention must be paid that during the removal of material with a tool, preferably a grinding or polishing tool, from a pre-profiled, hardened work piece a precise profile shape is achieved and that, on the other hand, a hardened layer of a required minimum thickness remains on the surfaces after the machining step. It is assumed that the pre-profiled work pieces, that have been hardened before the final machining step, have a hardened layer of a certain uniform thickness resulting from the respective hardening process employed.

It is therefore an object of the present invention to provide a method of the aforementioned general kind with which a precise profiling is achieved and a required minimum hardened layer of a desired thickness is guaranteed.

SUMMARY OF THE INVENTION

The method for recording removal of material during precision finishing of the present invention is primarily characterized by the following steps: a first measuring step of measuring a geometric position relative to the tool of at least some points of surfaces to be machined of the pre-profiled work piece, with those points being characteristic for a desired shape of the work piece and memorizing resulting first measurements; machining the surfaces of the work piece by removal of material; a second measuring step of measuring at least the points of the machined work piece that have been measured in the first measuring step, and memorizing resulting second measurements: comparing the first and the second measurements and computing data of effective removal of material at the positions; outputting the data of effective removal of material for the work piece.

With the resulting recording of removed material of at least some points of the surfaces to be machined of the pre-profiled work piece, with those points being characteristic for a desired shape of the work piece, it is ensured, that such work pieces that have a precise profile but have been machined such that an intolerable removal of material has taken place at at least one of the surfaces, so that a sufficient minimum thickness of the hardened layer may not be guaranteed, are sorted out. With the inventive recording it is also possible to sort out work pieces that have not been machined properly due to a misadjustment of the tool with too much play or tolerance. With a single clamping step of the work piece onto the machine tool equipped with a respective tool and a sensor, a high-precision machining or finishing is achieved, comprising within a short period of time an exact determination, based on exact measurements, of the amount of effectively removed material, including the determination of the presence of a minimum thickness of the hardened layer. The inventive recording of the removal of material may not only be used to sort out work pieces with an insufficient hardened layer on at least one of the machined surfaces but also as evidence that the work pieces which have been approved not only have the required precision profile and shape but also have at the machined surfaces a sufficient thickness of the hardened layer. Depending on the computer hardware and software of the computing device of the respective machine tool, the recording may be provided in the form of tables and/or graphic displays.

BRIEF DESCRIPTION OF THE DRAWINGS

The objects and advantages of the present invention, will appear more clearly from the following specification in conjunction with the accompanying drawings, in which.

DESCRIPTION OF PREFERRED EMBODIMENTS

The present invention will now be described in detail with the aid of several specific embodiments.

Figure 2:
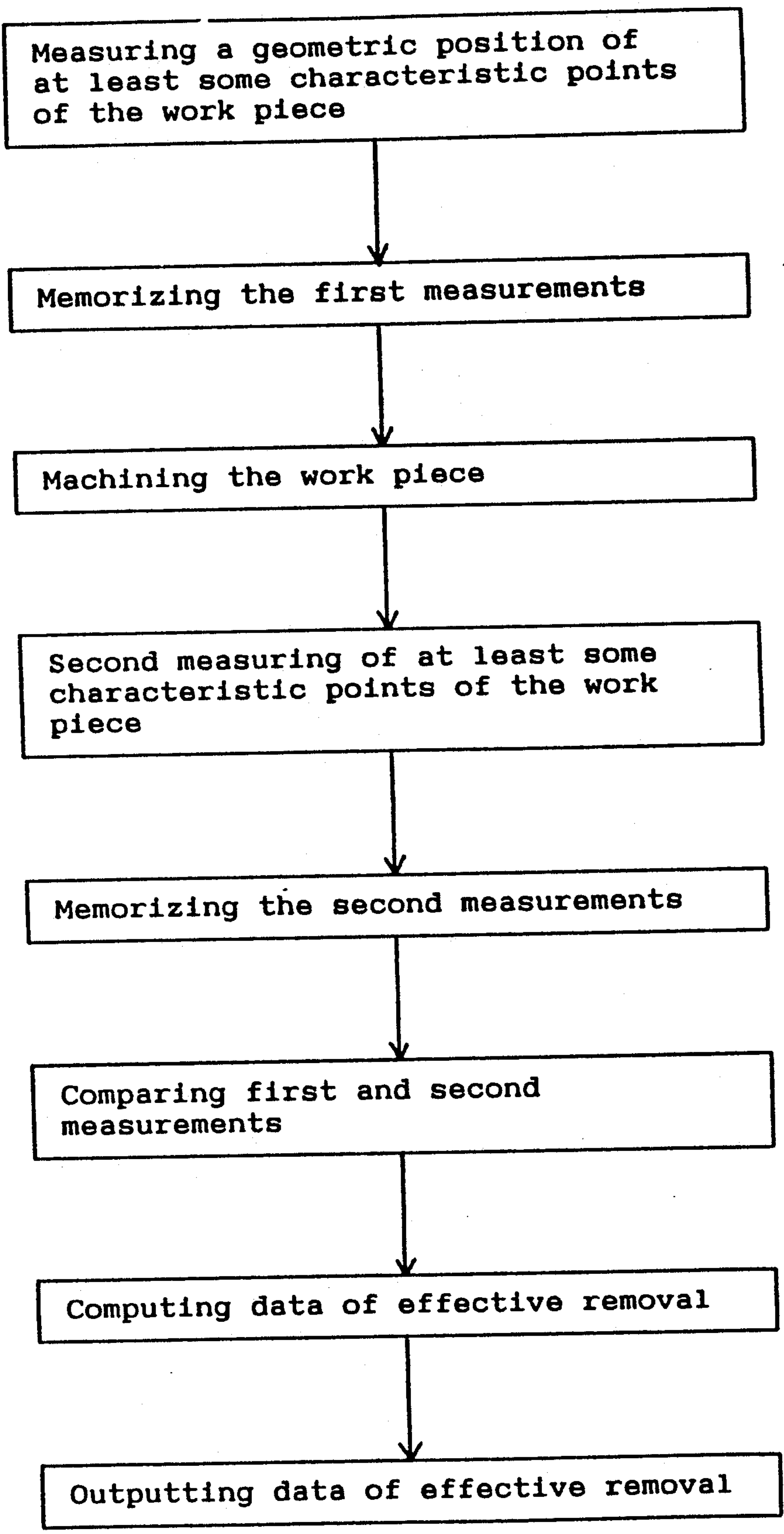
FIG. 2 is a diagrammatic representation of the method steps of the present invention.

In order to avoid the time consuming and expensive machining of a pre-profiled work piece when after the first measuring process it is determined that the machining of at least one of the surfaces will require a removal of material resulting in falling below the minimum required thickness of the hardened layer the present invention provides the following further steps: determining in a simulated computation before machining the work piece, based on the first measurements of the pre-profiled work piece, values for theoretical relative positions of the tool to the work piece after the machining; comparing the values for the theoretical relative positions with the first measurements and computing respective machining values for removal of material during the machining; sorting out ones of the work pieces that require the respective machining values to exceed admissible machining limits; performing machining, the second step of measuring, comparing and computing, and outputting on the work pieces not sorted out (see diagram of FIG. 2).

Figure 1:
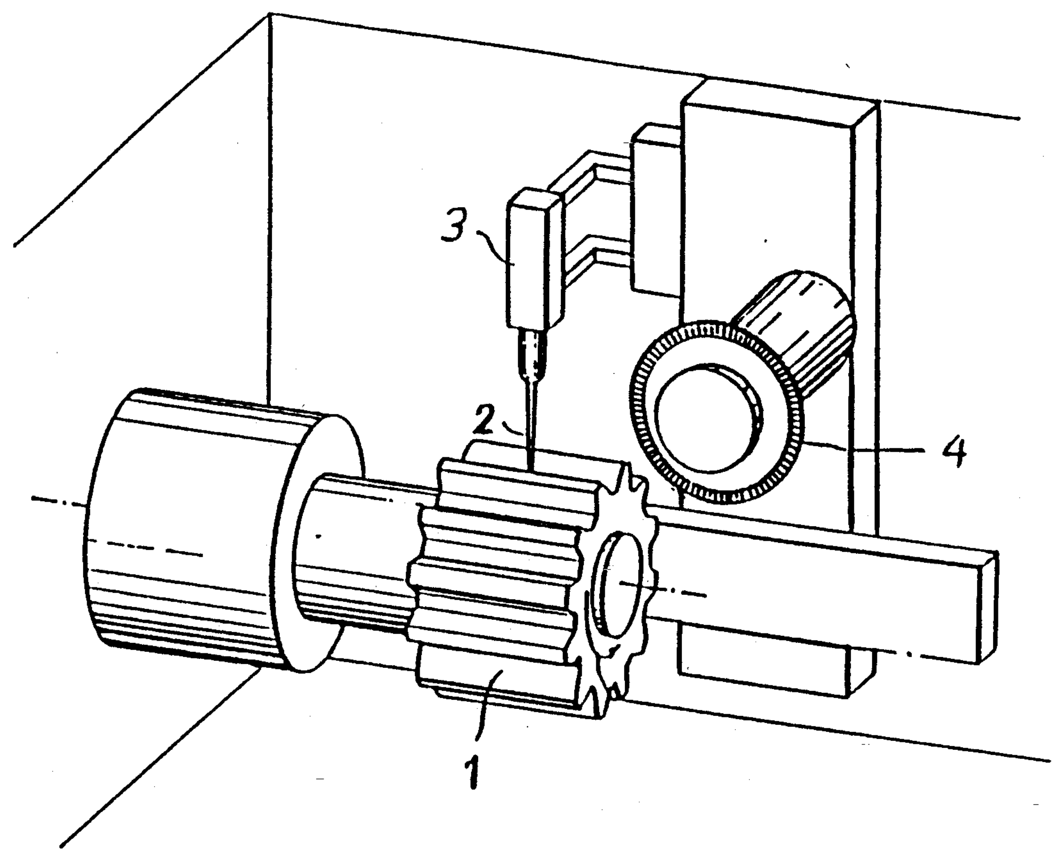
FIG. 1 schematically shows a toothed wheel being measured by a measuring sensor.

FIG. 1 shows a gear or toothed wheel 1 being geometrically measured at its surfaces with a measuring sensor 2 of a measuring device 3. The measured data are memorized. Subsequently the toothed wheel is ground at all functional surfaces with a grinding wheel 4, After completion of the grinding step, the toothed wheel is again geometrically measured at least at the same positions that have been previously measured. The second set of data is also memorized. The first and the second set of data is then compared and the effective amount of removed material is computed. The computed data are then recorded or documented, i.e., graphically displayed (plotted) or provided in the form of a table.

With this inventive embodiment it is possible to determine the quality of the finished product before the actual machining step takes place, based on the measurements taken of the pre-profiled work piece. Should it be impossible to produce a finished product of the required quality standards, for example, due to unavoidable deformations during the hardening step, the respective work piece is sorted out, resulting in reduced machining time and reduced machining and tool cost.

In a preferred embodiment, the geometric position of all the points of the surfaces to be machined are measured in the first measuring step and the work piece is then adjusted with respect to the theoretical positions such that an average minimum deviation of the theoretical positions relative to the first measurements is achieved (stock dividing), whereby it is ensured that at the point with the smallest deviation of the first measurement from the theoretical positions a minimum removal of material is carried out.

With the described integration of the known stock dividing method into the method of the present invention, the machining expenditure due to material removal may be minimized while at the same time it may be possible, by adjusting the theoretical zero position of the work piece, to reduce the removal of material at a position with a surface having a critically thin hardened layer to such an amount that a work piece usually considered to be below the quality standards may be finished to yield a quality product. Since the machine tool is already provided with a sensor having the necessary hardware and software, in most cases it is sufficient to upgrade the software in order to enable a respective machine tool to perform the described method of stock dividing and to realize the respective advantages of minimizing the removal of material and decreasing the machining time as well as reducing the amount of rejected work pieces.

With the present invention, a method for recording removal of material during the precision finishing of work pieces that must be of an extremely precise shape and must withstand extreme stress, as required especially in the aviation industry, is provided which ensures that the work piece has a hardened layer of a required minimum thickness at all stressed or load-carrying positions.

The present invention is, of course, in no way restricted to the specific disclosure of the specification, examples and drawings, but also encompasses any modifications within the scope of the appended claims.

What we claim is:

1. A method for recording removal of material during precision finishing of pre-profiled work pieces on a machine tool, comprising a tool, a sensor and a computing device, including the steps of:

a first measuring step of measuring a geometric position relative to said tool of at least some points of surfaces to be machined of said pre-profiled work piece, with said points being characteristic for a desired shape of said work piece, and memorizing resulting first measurements;

machining said surfaces of said work piece by removal of material;

a second measuring step of measuring at least said points of said machined work piece that have been measured in said first measuring step, and memorizing resulting second measurements;

comparing said first and said second measurements and computing data of effective removal of material at said positions;

outputting said data of effective removal of material for said work piece;

determining in a simulated computation before machining said work piece, based on said first measurements of said pre-profiled work piece, values for theoretical ones of said relative positions of said tool to said work piece after said machining;

comparing said values of said theoretical relative positions with said first measurements and computing respective machining values for removal of material during said machining;

sorting out ones of said work pieces that require said respective machining values to exceed admissible machining limits; and performing said machining, said second step of measuring, said comparing and computing, and said outputting on said work pieces not sorted out.

2. A method according to claim 1 including the steps of:

measuring in said first measuring step all of said points of said surfaces to be machined;

adjusting said work piece with respect to said theoretical positions such that an average minimum deviation of said theoretical positions relative to said first measurements is achieved.

* * * * *